United States Patent
Zhang

(10) Patent No.: US 11,855,538 B2
(45) Date of Patent: Dec. 26, 2023

(54) OUT-OF-AUDIO (OOA) SWITCHING VOLTAGE REGULATOR

(71) Applicant: TEXAS INSTRUMENTS INCORPORATED, Dallas, TX (US)

(72) Inventor: Liang Zhang, Beijing (CN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 77 days.

(21) Appl. No.: 17/563,213

(22) Filed: Dec. 28, 2021

(65) Prior Publication Data

US 2023/0208296 A1    Jun. 29, 2023

(51) Int. Cl.
*H02M 3/158* (2006.01)
*H02M 3/157* (2006.01)

(52) U.S. Cl.
CPC .......... *H02M 3/158* (2013.01); *H02M 3/157* (2013.01)

(58) Field of Classification Search
CPC .......................................... H02M 3/155–1588
See application file for complete search history.

(56) References Cited

U.S. PATENT DOCUMENTS

| | | | |
|---|---|---|---|
| 2006/0250120 A1* | 11/2006 | King | H02M 3/157 323/283 |
| 2011/0068867 A1* | 3/2011 | Moses | H03G 3/001 330/131 |
| 2012/0074924 A1 | 3/2012 | Dequina et al. | |
| 2017/0194865 A1 | 7/2017 | Wang et al. | |
| 2022/0368225 A1* | 11/2022 | Zhou | H02M 1/083 |

FOREIGN PATENT DOCUMENTS

| | | |
|---|---|---|
| CN | 107425720 A | 12/2017 |
| JP | 2009303384 A | 12/2009 |
| JP | 2013150515 A | 8/2013 |

OTHER PUBLICATIONS

A. Alam, M. K. Mukul and P. Thakura, "Wavelet Transform-Based EMI Noise Mitigation in Power Converter Topologies," in IEEE Transactions on Electromagnetic Compatibility, vol. 58, No. 5, pp. 1662-1673, Oct. 2016, (Year: 2016).*
International Search Report dated May 1, 2023.
JP2009303384A, Machine translation.
JP2013150515A, Machine translation.
CN107425720A, Machine translation.

* cited by examiner

*Primary Examiner* — Peter M Novak
(74) *Attorney, Agent, or Firm* — Charles F. Koch; Frank D. Cimino

(57) ABSTRACT

A control circuit includes a timeout circuit configured to receive a first control signal. The timeout circuit asserts a timeout output signal on a timeout circuit output responsive to an expiration of a time period following assertion of the first control signal. A counter circuit has an input coupled to the timeout circuit output and has a counter circuit output. Responsive to assertion of the first control signal, the counter circuit selectively increments an output count value on the counter circuit output responsive to the timeout output signal having a first logic state or decrements the output count value on the counter circuit output responsive to the timeout output signal having a second logic state. A comparator circuit has a control input coupled to the counter circuit output. The comparator circuit adjusts a magnitude of a reference signal responsive to the output count value from the counter circuit.

20 Claims, 7 Drawing Sheets

US 11,855,538 B2

OUT-OF-AUDIO (OOA) SWITCHING VOLTAGE REGULATOR

BACKGROUND

A voltage regulator receives an input voltage and produces a regulated, output voltage. One class of voltage regulators includes switching voltage regulators. A switching regulator includes one or more transistors that are switched on and off. At relatively heavy load conditions (higher output current), the switching frequency is above the upper limit of human hearing. The upper limit of human hearing is generally regarded as being approximately 20 KHz. At lighter load conditions (lower output current levels), a switching regulator may maintain the regulation of the output voltage by decreasing the switching frequency. If the switching frequency were within the range of human hearing (e.g., below 20 KHz), such electrical switching noise may be result in audio noise in system that has a speaker. For example, audible noise may be heard through the infotainment system in an automobile, where the infotainment system has a voltage regulator.

SUMMARY

In at least one example, a control circuit for a voltage converter includes a timeout circuit that receives a first control signal. The timeout circuit asserts a timeout output signal at the expiration of a predetermined time period following assertion of the first control signal. The control circuit includes a counter circuit having an input coupled to the time output circuit output and having a comparator circuit output. Upon assertion of the first control signal, the counter circuit increments an output count value on the counter circuit output responsive to the timeout output signal being at a first logic state or decrements the output count value on the counter circuit output responsive to the timeout output signal being at a second logic state. A control input of the comparator circuit couples to the counter circuit output. The comparator circuit adjusts a reference signal responsive to the output count value from the counter circuit.

DETAILED DESCRIPTION

Examples of buck converters are described herein that reduce or eliminate switching noise that may be manifested as audio noise. However, the principles described herein pertain to other types of switching regulators such as a boost converter, a buck-boost converter, etc. The converter examples described herein operate to maintain switching frequencies above the upper limit of human hearing (e.g., above approximately 20 KHz). Such switching voltage regulators thus are referred to as "out-of-audio" regulators (converters).

Figure 1:
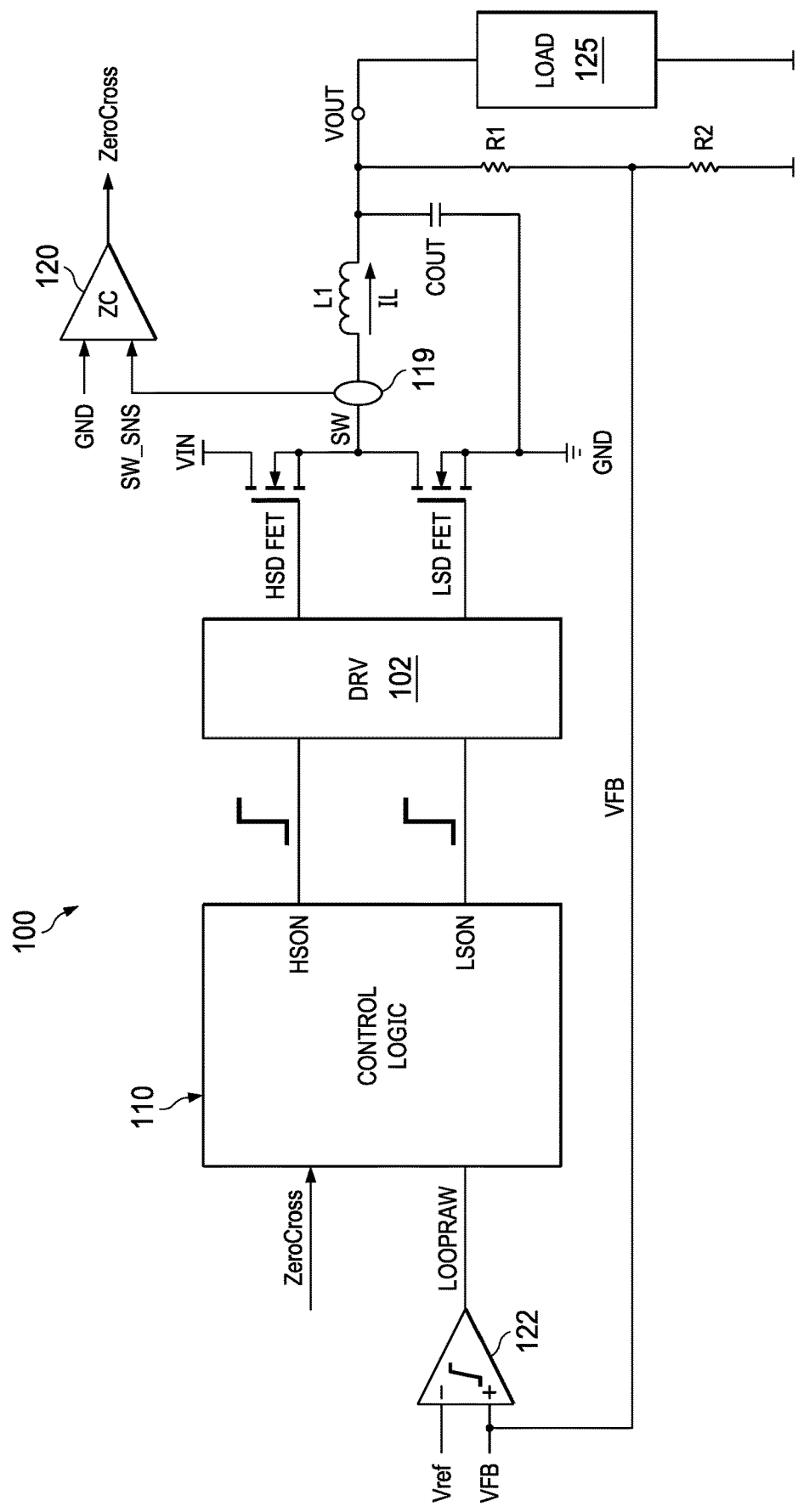
FIG. 1 is a schematic diagram of buck converter in accordance with an example.

FIG. 1 shows an example of a buck converter 100 that includes a high side (HSD) transistor coupled to a low side (LSD) transistor at a switch node (SW). The transistors are shown as field effect transistors (FETs) in FIG. 1 and thus are labeled as HSD FET and LSD FET. The series coupling of the HSD and LSD FETs is between an input voltage VIN and ground. One terminal of an inductor L1 is coupled to the SW node, and the other inductor terminal provides the regulated output voltage (VOUT) and is also coupled to an output capacitor COUT. Control logic 110 controls the on and off states of the HSD and LSD FETs to thereby create a square wave on the SW node with a duty cycle implemented by the control logic. Driver 102 converts the digital control signals (HSON and LSON) from the control logic 110 to appropriate voltages for the gates of the HSD and LSD FETs to turn them on and off as intended. The magnitude of VOUT is a function of VIN and the duty cycle implemented by the control logic 110. A load 125 can be coupled to the inductor L1 and thus receives VOUT from the converter. A zero cross (ZC) comparator 120 compares a signal (SW_SNS) indicative of inductor current IL to a ground reference to determine when the inductor current reaches 0 amperes. The signal SW_SNS indicative of IL is from a current sensor 119. Current sensor 119 may include a sense resistor whose voltage is proportional to current. Current sensor 119 alternatively may be include a sense FET coupled in parallel with the LSD FET and which generates a voltage proportional to the current through the LSD FET. A resistor divider formed by R1 in series with R2 between VOUT and ground provides a feedback voltage (VFB) that is proportional to VOUT. Comparator 122 uses VFB as a proxy for VOUT and compares VFB to a reference (VREF) to produce a LOOPRAW signal to the control logic 110 indicative of VOUT being above or below a threshold voltage (VREF). The LOOPRAW signal is provided to and is used by the control logic 110 to determine when VOUT (VFB) has fallen to a threshold level to then turn on the HSD FET to boost VOUT back up to a higher voltage.

The buck converter 100 provides a regulated level of VOUT through a wide range of load current. As the current needs of the load decreases, the control logic 110 dynamically adjusts the timing control of the HSD and LSD FETs to maintain a regulated level of VOUT. For higher load conditions, the control logic 110 operates in a continuous conduction mode (CCM) during which the HSD and LSD FETs are continuously and reciprocally toggled on and off—the LSD transistor is turned on when the HSD FET turned off, then the LSD FET is turned off and the HSD FET is turned back on, and so on (with a small "dead time" between switching to avoid a shoot-through current condition). Current continuously flows through the inductor L1 during CCM. At lighter load conditions (e.g., the load enters a sleep state), the control logic may enter a discontinuous conduction mode (DCM). At one point during each switching cycle of the DCM, neither HSD nor LSD FET is on.

Figure 2:
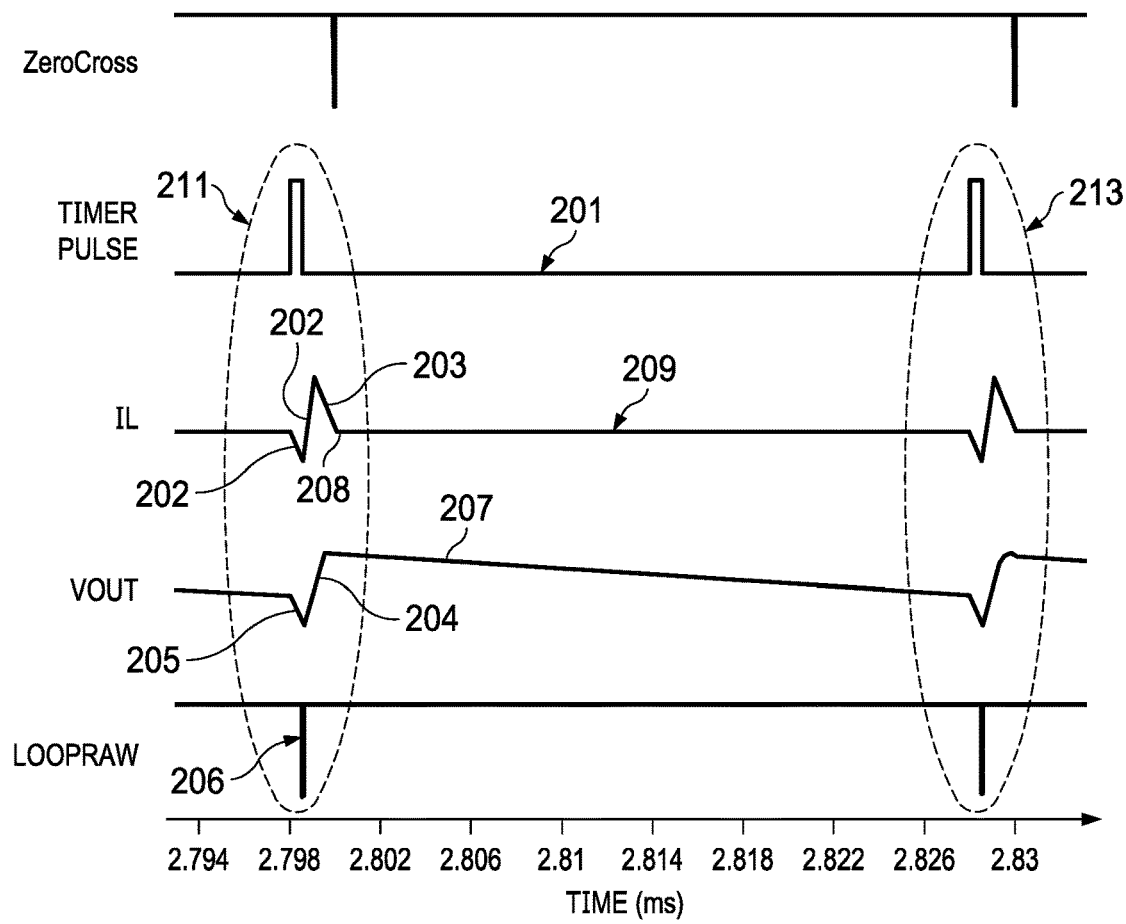
FIG. 2 is a timing diagram illustrating the operation of the buck converter of FIG. 1 in accordance with an example.

FIG. 2 is a timing diagram that illustrates a pulse skipping mode (PSM), which is a type of DCM, for the control logic at even lower load levels. A pulse event 211 is shown on the left-hand side of the timing diagram. For this pulse event, the control logic 110 first turns on the LSD FET which causes IL to decrease as shown at 202. Turning on the LSD FET also discharges the SW node causing VOUT to decrease as shown at 205. Once VOUT (or its proxy, VFB) falls below VREF, comparator 122 asserts (e.g., low) LOOPRAW (206). The control logic 110 responds to a low assertion of LOOPRAW by turning off the LSD FET and turning on the HSD FET for a defined period of time. With the HSD FET on, both IL and VOUT increase as indicated at 202 and 204, respectively. At the expiration of the defined period of time that the HSD FET is on, the control logic 110 turns off the HSD FET and turns on the LSD FET. With the LSD FET on, IL decreases towards 0 amperes (amps) as shown at 203. VOUT also begins to decrease as shown at 207.

The ZC comparator 120 determines when IL reaches 0 amps (time point 208 in FIG. 2) and asserts (e.g., logic high) its ZERO CROSS output signal. The control logic 110 responds to the assertion of ZERO CROSS by turning off the LSD FET. At that point (time point 208), both the HSD and LSD FETs are off and IL remains at 0 amps until the next pulse event 213. With the HSD FET being off, VOUT also decreases (207). The control logic 110 includes a timer that determines when the elapsed time from the moment the ZC comparator 120 detects the zero crossing point (i.e., IL has reached 0 amps) has reached a predetermined period of time that is approximately equal to the period of the frequency of the upper limit of human hearing. If the upper limit is 20 KHz, the period of 20 KHz waveform is 50 microseconds. Accordingly, the timer within the control logic 110 determine when approximately 50 microseconds has elapsed since the zero crossing event occurred.

Comparator 122 compares VREF to VFB. When the earlier of VFB falling below VREF or the timer expires (as determined by the control logic 110), the control logic 110 responds by initiating another pulse event to occur. If the LOOPRAW output of comparator 122 caused the control logic 110 to initiate the next pulse event, that pulse event does not start by turning on the LSD FET. Instead, the pulse event begins with turning on the HSD FET. However, if the timer within the control logic expires before LOOPRAW is asserted, then the control logic 110 initiates the next pulse event by turning on the LSD FET. FIG. 2 shows that both pulse events 211 and 213 begin with turning on the LSD FET to discharge VOUT. Pulse events 211 and 213 are examples of a three-phase pulse event in which the LSD FET is turned on, then the HSD FET, and then again the LSD FET. If the initial LSD FET on-phase is not performed, then the resulting pulse event is a two-phase pulse event in which the HSD FET is first turned on followed by turning on the LSD FET.

As explained above, the timer's time period is configured to be approximately equal to the period of a 20 KHz signal, which is the generally regarded as the upper frequency range of human hearing. Thus, the control logic 110 initiates another pulse event when VFB falls too low (below VREF) but, to avoid an audio signal, the control logic 110 ensures that the next pulse event occurs quickly enough to thereby ensure that the pulse events occur at a rate that is faster than 20 KHz, and thus above the audible frequency range.

Figure 3:
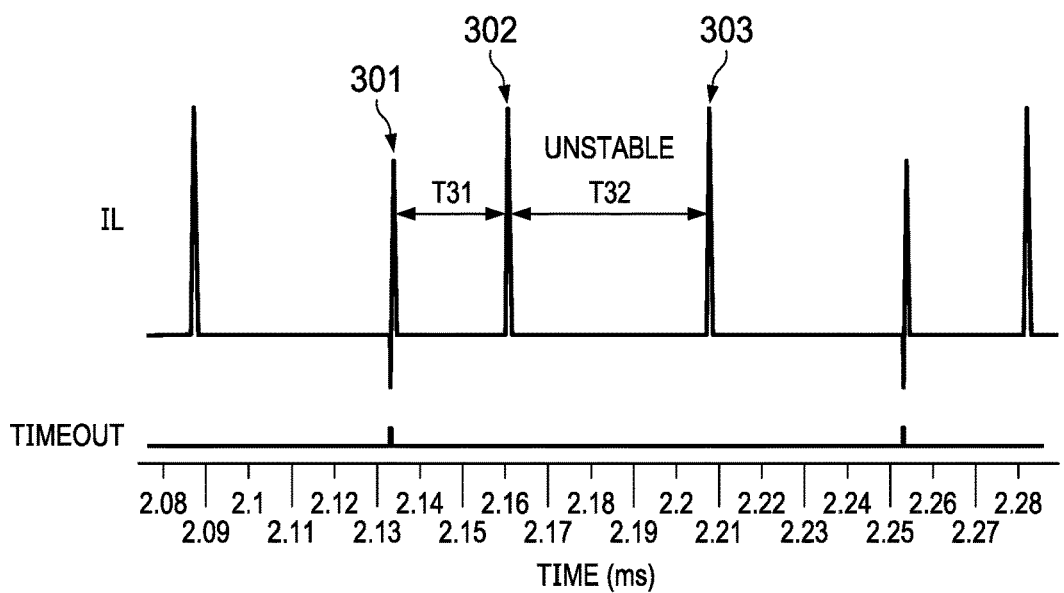
FIG. 3 is an inductor current waveform illustrating an instability problem that may occur with the buck converter of FIG. 1.

FIG. 3, however, illustrates a stability problem with the aforementioned out-of-audio PSM technique. As described above, some pulse events are three-phase pulse events (e.g., pulse event 301) which begins with turning on the LSD FET to partially discharge VOUT. Typically, there is a minimum amount of on-time for the LSD FET. This minimum on-time may cause VOUT to discharge to a lower level than is otherwise desirable. With VOUT now starting at a lower level during the phase in which both FETs are turned off, the next pulse event is initiated by VREF falling below VREF (comparator 122) and occurs sooner than would have otherwise been the case. That is, it takes less time for VFB to fall below VREF than if VOUT had not first been over-discharged. This smaller inter-pulse event elapsed time is shown in FIG. 3 between pulse events 301 and 302 as time T31. Pulse event 302 is a two-phase pulse event and thus does not begin with a VOUT discharge phase. As a result, VOUT is boosted to a higher voltage compared to what would have happened had VOUT first been discharged by first turning on the LSD FET. The next pulse event 303 is another three-phase pulse event that is initiated by the control logic 110 due to its internal timer (e.g., 50 microsecond) expiring before VFB reached VREF. Thus, elapsed time between pulse events 302 and 303 (T32) is larger than T31. In some cases, such as is shown in FIG. 3, the control logic 110 alternates between the three-phase pulse events (e.g., pulse events 301 and 303) and the two-phase pulse events (e.g., pulse event 302). As a result, the pulse events do not occur at a periodic rate. The converter reduces switching noise within the audible frequency range, but is unstable in this condition.

Figure 4:
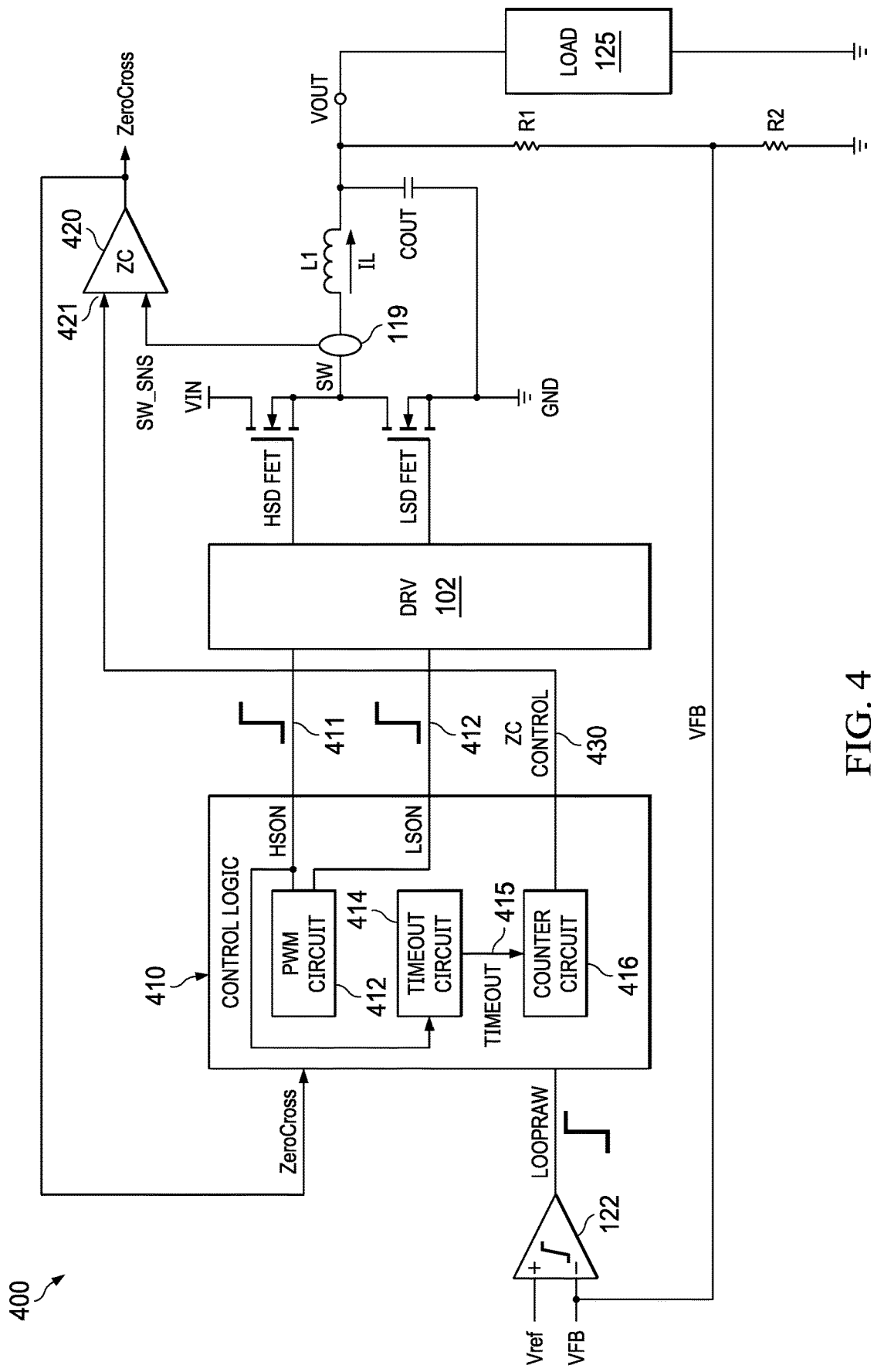
FIG. 4 is a schematic diagram of buck converter having a timeout circuit, a counter circuit, and zero cross comparator in accordance with another example that solves the instability problem.

FIG. 4 is a circuit schematic of an example buck converter 400 that addresses the aforementioned problem—buck converter 400 is an out-of-audio converter that does not have the instability problem of buck converter 100. In this example, buck converter 400 includes HSD FET coupled to LSD FET between VIN and ground. One terminal of inductor L1 is coupled to the switch node (SW), and the other inductor terminal provides the regulated output voltage (VOUT) from buck converter 400 and is also coupled to the output capacitor COUT. A load 125 can be coupled to the inductor L1 to receive VOUT from the converter. Control logic 410 controls the on and off states of the HSD and LSD FETs to thereby create a square wave on the SW node with a particular duty cycle. Control logic 410 is different (explained below) than control logic 110 in FIG. 1.

A ZC comparator 420 is included as well, but, as explained below, is different than ZC comparator 120 in FIG. 1. The ZC comparator 420 compares a signal SN_SNS indicative of inductor current IL to a reference signal generated internal to the ZC comparator 420 to determine when the inductor current reaches 0 amperes. The signal SW_SNS indicative of IL is from the current sense circuit 119. The resistor divider formed by R1 in series with R2 provides the feedback voltage (VFB) that is proportional to VOUT. Comparator 122 compares VFB to a reference (VREF) and produces the LOOPRAW signal to the control logic 410 indicative of VOUT falling below a threshold level.

The control logic 410 includes a PWM circuit 412, a timeout circuit 414, and a counter circuit 416. The output signal from counter circuit 416 is the ZC control signal 430 which is provided to a control input 421 of the ZC comparator 420. As explained below, the ZC control signal 430 causes the ZC comparator 420 to adjust its reference signal for comparison to SW_SNS. Whereas in FIG. 1 in which ZC comparator 120 compared SW_SNS to a fixed reference (ground), in FIG. 4, the reference signal to which SW_SNS signal is compared can be dynamically adjusted by the control logic 410. Being able to have fine control over the magnitude of the reference signal within the ZC comparator 420 helps to negate the problem caused by the minimum on-time of the LSD FET, and consequently to avoid the instability problem described above.

The PWM circuit 412 of the control logic 410 generates the HSON signal 411 to the driver 102. Responsive to the logic state of the HSON signal 411, the driver 102 generates a suitable voltage to turn on or off the HSD FET. Similarly, the control logic 410 generates the LSON signal 412 to cause the driver 102 to generate a suitable voltage to turn on or off the LSD FET. The HSON signal 411 also is coupled to the timeout circuit 414. The output of the timeout circuit 414 is coupled to the counter circuit 416 and provides a TIMEOUT signal 415 to the counter circuit 416. The timeout circuit 414 generates the TIMEOUT signal 415 after a fixed time period following the PWM circuit 412 turning off the HSD FET. The fixed time period is approximately the length of a period of a 20 KHz signal (e.g., approximately 50 microseconds). When the PWM circuit 412 controls HSON 411 to turn on the HSD FET, the counter 414 increments its output count value (ZC CTL 450) if, at that moment, the TIMEOUT signal 415 is indicative of the expiration of the timeout circuit's time period (e.g., 50 microseconds). Alternatively stated, if more than 50 microseconds (or whatever time period is configured into the timeout circuit 414) has elapsed since the last pulse event to when the PWM circuit 414 determines it is now time for the next pulse event, the counter 414 increments its count value. If less than 50 microseconds (or whatever time period is configured into the timeout circuit 414) has elapsed since the last pulse event to when the PWM circuit 414 determines it is now time for the next pulse event, the counter 414 decrements its count value. The output count value from the counter 414 is ZC CTL 450 and, in one example, is an m-bit binary value (m is 1 or more). In one example, m is 2 and thus ZC CTL 450 is a two-bit binary value.

Figure 5:
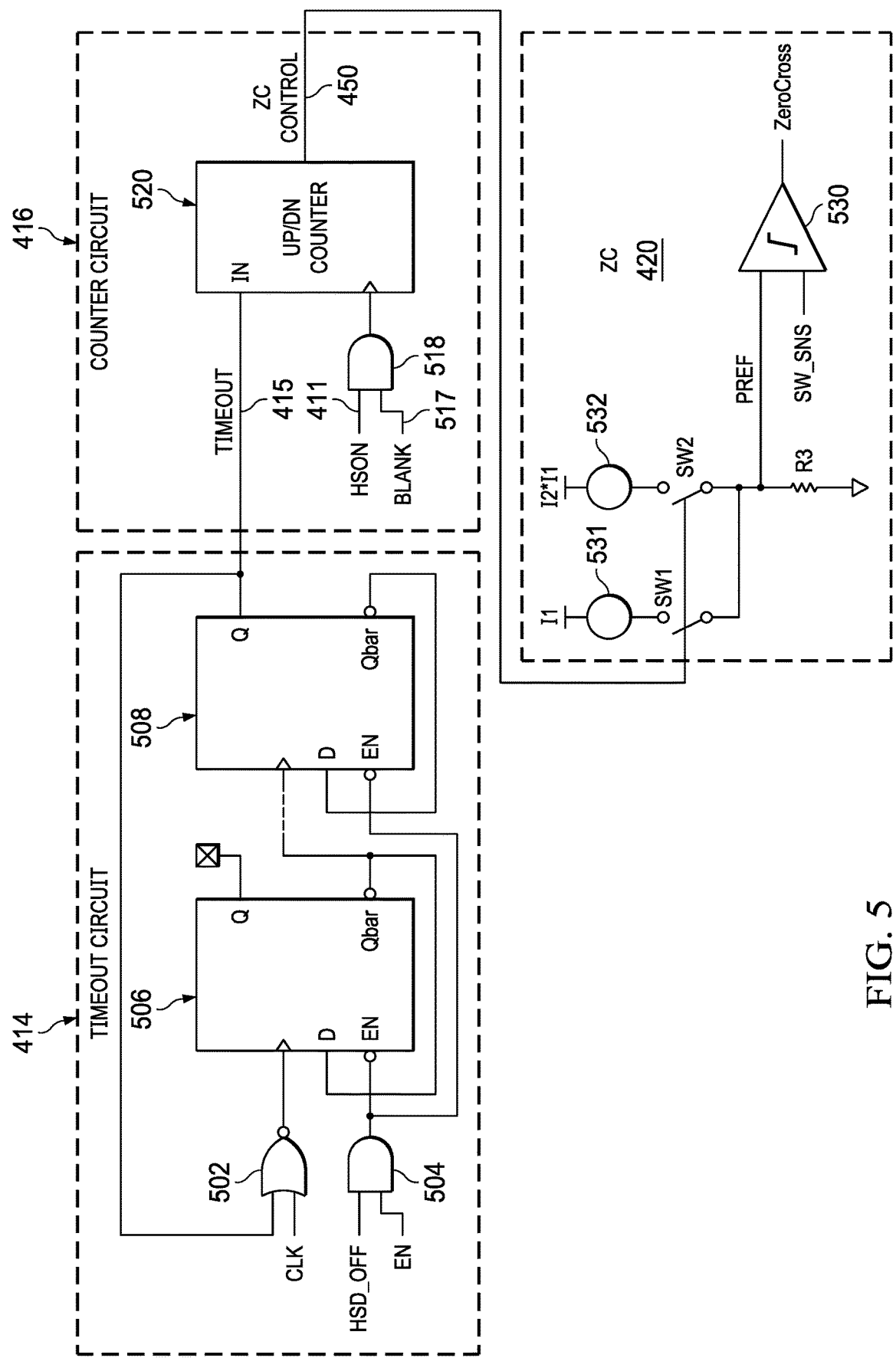
FIG. 5 is a schematic diagram illustrating an implementation of the timeout circuit, a counter circuit, and zero cross comparator of the buck converter of FIG. 4 in accordance with an example.

FIG. 5 is a schematic diagram of the timeout circuit 414, the counter 414, and ZC comparator 420 in accordance with one example. The timeout circuit 414 in this example includes a NOR gate 502, an AND gate 504, and one or more cascaded flip-flops 506, 508. Each flip-flop has a Q output and a Qbar (logical inverse of Q) output. The flip-flops are cascaded together with the Qbar output of one flip-flop coupled to the clock input of the next flip-flop in the chain. Each flip-flop's Qbar output also is coupled its data (D) input. Each flip-flop also has an active low enable input. Initially, the flip-flops are disabled which forces their Q outputs to be a 0 and their Qbar outputs to be a 1. Because each Qbar output is coupled to the respective D input, a logical 1 is present on the D input of each flip-flop when the flip-flops are disabled. The logical 1 on a flip-flop's D input will propagate to its Q output when the respective flip-flop is enabled and then clocked.

The output of NOR gate 502 is coupled to the clock input of the first flip-flop in the chain—flip-flop 506 in this example. The output of AND gate 504 is coupled to the enable inputs of the flip-flops 506, 508. A clock (CLK) is provided to one input of NOR gate 502. In one example, CLK has a frequency in the range of 250 KHz to 2 MHz. The Q output of the last flip-flop in the chain (flip-flop 508 in this example) provides the TIMEOUT signal 415. The TIMEOUT signal 415 is provided to the other input of NOR gate 502. One input of AND gate 504 receives an enable (EN) signal (active low) and the other input of AND gate 504 receives an HSD_OFF signal. In this example, the HSD_OFF signal is asserted low when the HSD FET is off, otherwise HSD_OFF is high. In one example, the PWM circuit 412 generates the EN and HSD_OFF signals.

The timeout circuit 414 is enabled and begins to count pulses of the CLK when EN and HSD_OFF are asserted low by the PWM circuit 412. Initially, TIMEOUT 415 is low and thus, the output of NOR gate 502 toggles between high and low logic levels inversely related to high and low assertions of CLK. Accordingly, the falling edges of CLK cause the flip-flop 506 to change state. The frequency of CLK and the number of flip-flops is application-specific to measure a defined period of time (e.g., 50 microseconds). The cascaded arrangement of flip-flops 506, 508 is a multi-stage timer. The first flip-flop 506 is clocked by the output signal from NOR gate 502. TIMEOUT is initially a 0, and thus the output of NOR gate 502 to the clock input of the first flip-flop 506 has a rising edge upon a falling edge of CLK. Because the D input of flip-flop 506 is a logic 1 (due to Qbar initially being a logic 1), upon being clocked, the Q output of the first flip-flop 506 becomes a logic 1 and the Qbar output of the first flip-flop 506 then becomes a logic 0. The Qbar output of flip-flop 506 is provided to the D input of the first flip-flop. Upon the next falling edge of CLK, the first flip-flop 506 is again clocked and this time the Q output of the first flip-flop 506 becomes a 0 and its Qbar becomes a 1.

This rising edge of Qbar of flip-flop 506 then clocks the next flip-flop in the chain to thereby force the Q output of the second flip-flop to a logic 1 state. The Qbar output of the second flip-flop becomes a logic 0 and is clocked through the D input of the second flip-flop the next time that the first flip-flop's Qbar output again changes from a 0 to 1. Thus, the frequency of the Q output of the second flip-flop is one-half the frequency of the Q output of the first flip-flop 506. This process continues until the last flip-flop in the chain asserts TIMEOUT 415 on its Q output to a logic 1 state. The Q output of each flip-flop in the chain is one-half the frequency of the preceding flip-flop's Q output. Once TIMEOUT 415 is asserted high by the last flip-flop in the chain, the output of NOR gate 502 becomes frozen at a logic low level thereby stopping the chain of flip-flops from continuing to change state and freezing TIMEOUT 415 at a logic high level.

The counter circuit 416 includes an AND gate 518 and an up/down counter 520. The counter has an input (IN), a clock input, and an output. The count value output from the up/down counter 520 is the m-bit ZC_CTL signal. For each rising edge on its clock input (which is the output from AND gate 518), the up/down counter 520 either increments its output count value if TIMEOUT 415 is a 1, or decrements its output count value if TIMEOUT 415 is a 0. The input signals to AND gate 518 are HSON 411 and a blanking signal (BLANK) 517 (with BLANK 517 being inverted as an input to AND gate 518). Assuming BLANK 517 is logic low, upon a low-to-high transition of HSON 411, the up/down counter 520 either increments or decrements ZC_CTL responsive to TIMEOUT 415 being a high or low, respectively. When BLANK 517 is logic high, the up/down counter 520 is prevented from incrementing or decrementing its output count value, ZC_CTL. Accordingly, BLANK 517 and AND gate 518 are operative to gate off HSON 411 to prevent the up-down counter 520 from counting. This functionality is useful for hysteresis purposes as explained below.

Assuming BLANK 517 is low, when HSON 411 is asserted high to turn on the HSD FET, the up/down counter 520 increments its count value upon receipt of a high assertion of the TIMEOUT signal 415. This condition means that the amount of elapsed time from the occurrence of the previous pulse event to the next pulse event has exceeded the time period configured into the timeout circuit 414, which in turn means that the frequency of the pulses is less than, for example, 20 KHz. Conversely, when HSON 411 is asserted high to turn on the HSD FET, the up/down counter 520 decrements its count value upon receipt of a low assertion of the TIMEOUT signal 415. This condition means that the amount of elapsed time from the occurrence of the previous pulse event to the next pulse event is less than the time period configured into the timeout circuit 414, which in turn means that the frequency of the pulses is greater than, for example, 20 KHz.

Figure 6:
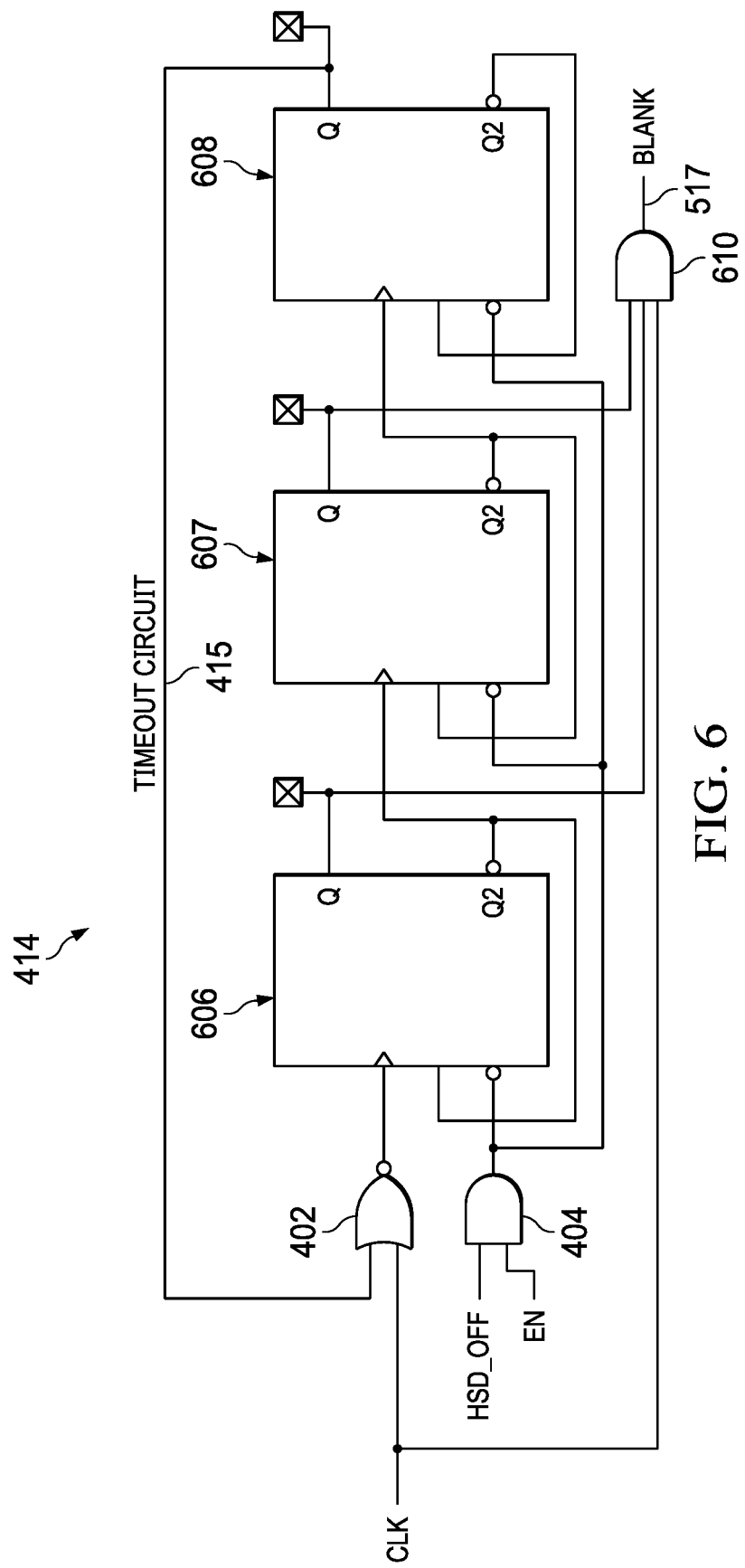
FIG. 6 is a schematic diagram illustrating a specific example implementation of the timeout circuit.

Because counter 520 is an up and down counter, the counter output might increment and decrement too quickly in the edge condition in which TIMEOUT is high in one cycle, then low in the next cycle, then high in the next, and so on. The use of BLANK 517 to prevent the counter 520 from changing its count value advantageously introduces hysteresis into the converter. FIG. 6, described below, provides an example implementation for the generation of BLANK 517.

Referring still to FIG. 5, the ZC comparator 420 includes a comparator 530, one or more current sources 531 and 532, a switch SW1 and SW2 for each of the respective current sources, and a resistor R3. Two current sources are shown in this example, but there can be more than two current sources in other implementations. In the example of FIG. 5, the current sources are binary-weighted. Current source 531 produces a unit current (I1) and current source 532 produces current that is twice the unit current (2*I1). A third current source (if included) would produce a current that is four times the unit current (4*I1), and so on. Each of the bits of ZC CTL 430 is coupled to one of the switches. For example, bit-0 of ZC CTL 430 is coupled to SW1 (associated with the unit current source 531), and bit-1 is coupled to SW2. Thus, the ZC CTL 430 binary value controls which switches in the ZC comparator 420 are open or closed. When SW1 is closed, the unit current I1 from current source 531 flows into resistor R3. When SW2 is closed, the 2*I1 current from current source 532 flows into resistor R3. If both switches are closed, then 3*I1 current flows into resistor R3. With two, binary-weighted current sources 531 and 532, four possible current values are possible through resistor R3—zero current (for which the zero-cross threshold is zero), I1, 2*I1, and 3*I1. With additional binary-weighted current sources, additional levels of current are possible. The voltage that results across resistor R3 is the reference voltage PREF to which the IL current sense signal (SW_SNS) is compared by comparator 530.

While ZC comparator 420 is referred to as a "zero cross" comparator, because the reference signal is configurable, the ZC comparator 420 compares SW_SNS to a configurable reference signal (not necessarily equal to 0 volts). The ZC comparator 420 thus has a configurable reference value that is controlled by ZC CTL 430 from the counter circuit 416. If TIMEOUT 415 is asserted high when HSON 411 is asserted high (and BLANK is high), the counter 520 increments the binary value of ZC CTL (up or down) to change the configuration of the switches SW1 and SW2 in the ZC comparator 420 to thereby increase the magnitude of the reference signal (PREF) to which SW_SNS is compared. If TIMEOUT 415 is still logic lo when HSON 411 is asserted high (and BLANK is high), the counter 520 does not change the value of ZC CTL 430 and thus the voltage magnitude of the PREF reference signal remains unchanged.

Figure 7:
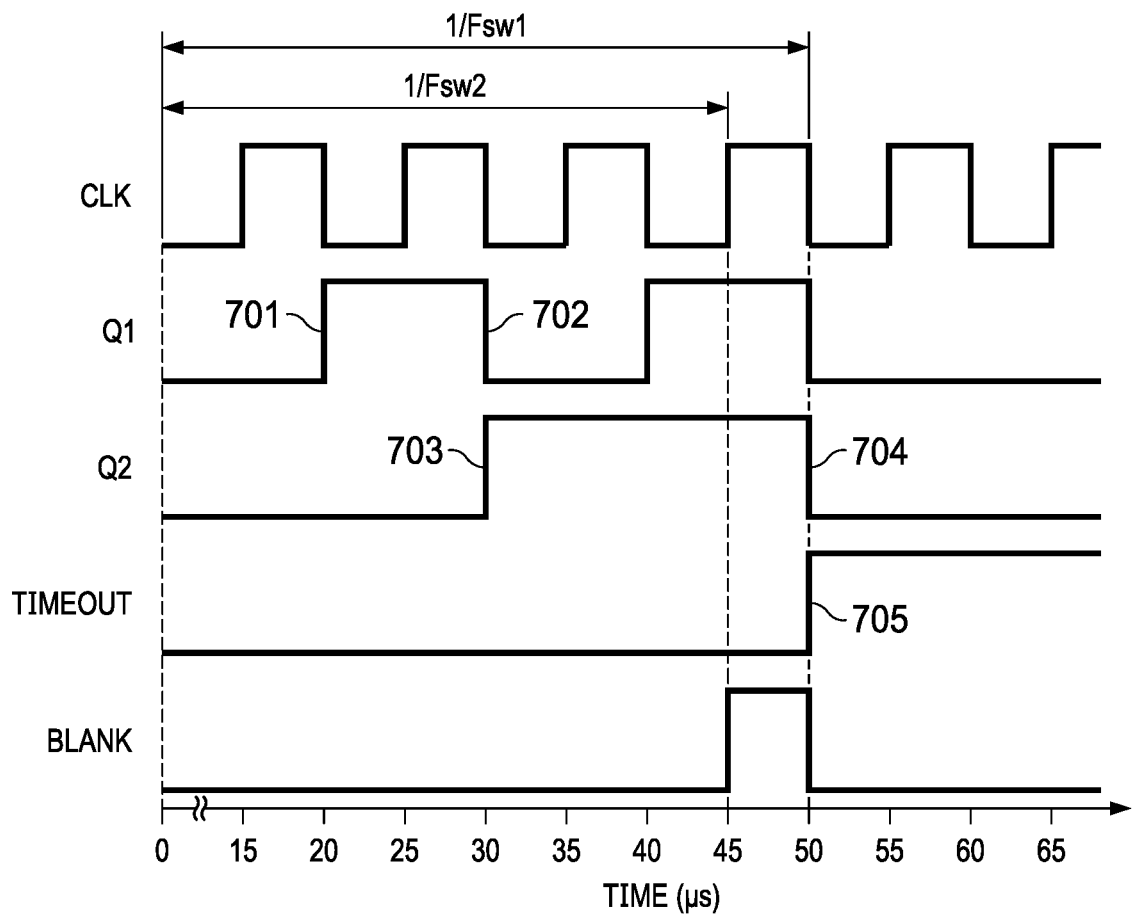
FIG. 7 is a timing diagram illustrating the operation of the buck converter of FIG. 4 in accordance with an example.

FIG. 6 is a specific example of the timeout circuit 414 that includes three flip-flops 606, 607, and 608, and thus comprises a three-stage timer. FIG. 7 is a corresponding timing diagram. In this example, the frequency of CLK is 250 KHz. The signal from the Q output of flip-flop 606 is labeled Q1. The signal from the Q output of flip-flop 607 is labeled Q2. The signal from the Q output of flip-flop 608 is TIMEOUT 415. As shown in FIG. 7, Q1 changes from a 0 to 1 at 701 commensurate with a falling edge of CLK. Q1 changes back to a 0 upon the next falling edge of CLK, as shown at 702. Q2 changes from a 0 to 1 at 703 commensurate with the falling edge 702 of Q1. Q2 changes back to a 0 upon the next falling edge of Q1, as shown at 704. The TIMEOUT signal 415 is asserted high (705) on the falling edge 704 of Q2.

The timeout circuit 414 in this example also includes an AND gate 610 to generate BLANK. Three signals are coupled respective inputs of AND gate 610. One signal is CLK. A second signal is Q1, and third signal is Q2. The BLANK signal in this example is asserted by AND gate 610 when both the first two flip-flops 606 and 607 have been clocked, and upon the next high assertion of CLK. Thus, BLANK is asserted high before TIMEOUT 415 is asserted high. Once BLANK is asserted high, the counter 520 (FIG. 5) is prevented from advancing its count value. In one example, BLANK prevents the up/down counter 520 from counting within a relatively short time period before the expiration of the full time period (e.g., 50 microseconds) of the timeout circuit to introduce hysteresis. In one example, BLANK is asserted high 5-10 microseconds before TIMEOUT is asserted high. The PREF reference signal is not permitted to change once BLANK asserts high.

Figure 8:
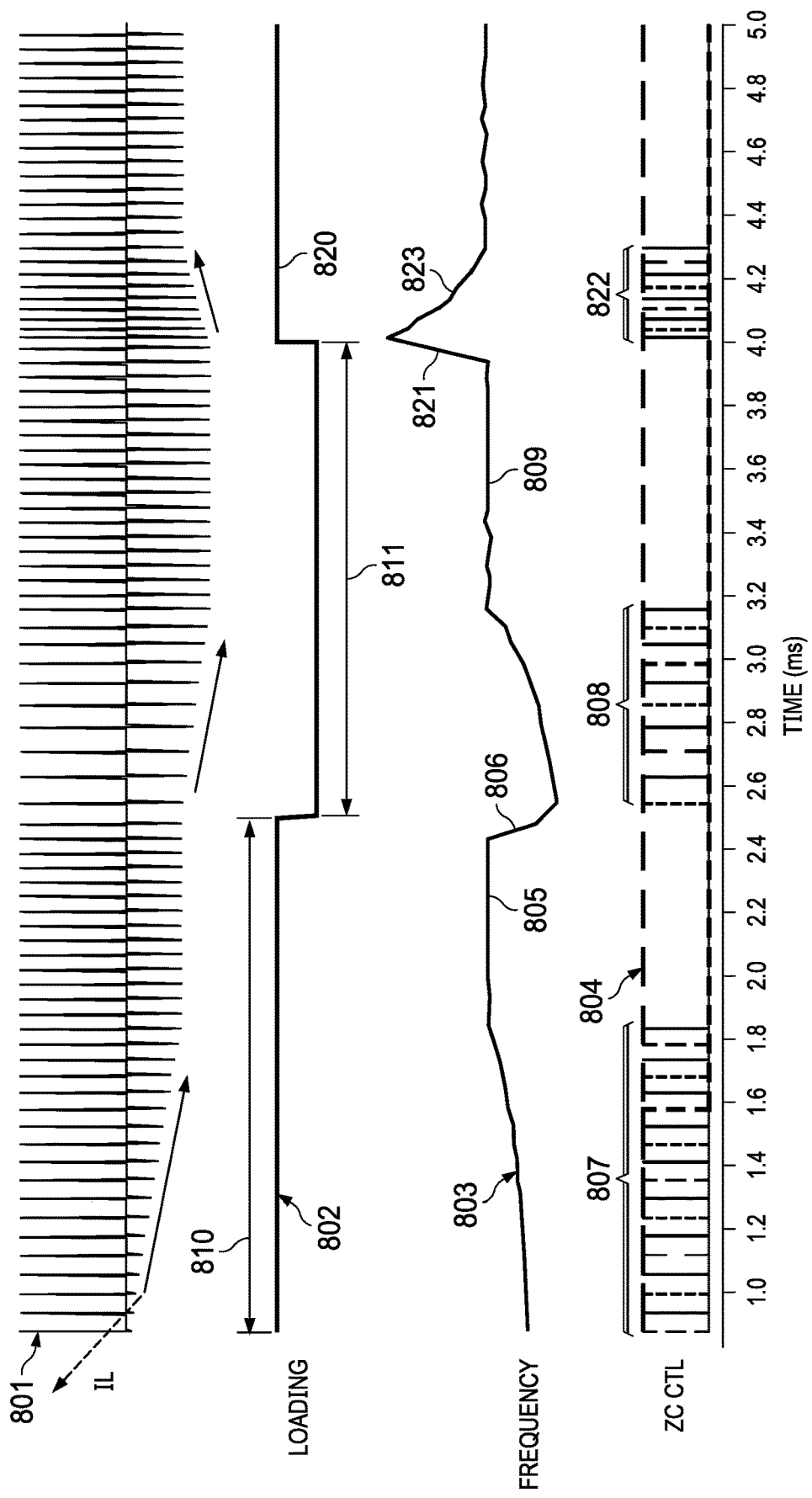
FIG. 8 includes waveforms illustrating the operation of the buck converter of FIG. 4 to maintain the switching frequency above the upper frequency range of human hearing.

FIG. 8 shows example waveforms illustrating the operation of the buck converter 400. The waveforms include 801-804. Waveform 801 is the inductor current IL. Waveform 802 illustrates the load current (current to load 125). The load current waveform 802 illustrates a heavier load condition 810 (albeit a light load at approximately 15 mA) and a lighter load condition 811 (approximately 8 mA). Waveform 803 represents the switching frequency of the converter. Waveform 804 represents the ZC CTL signal 430 which advances its value each cycle (807) until the switching frequency exceeds 20 KHz and settles at approximately 21.75 KHz (above the range of human hearing) as shown at 805. With each advancement of the value of ZC CTL, the PG_GND reference signal for the comparator 530 further increases thereby changing the reference comparison signal for the ZC comparator 420.

One the target frequency is reached, the advancement of ZC CTL ceases and the switching frequency remains at approximately 21.75 KHz. Upon transition to the lighter load condition 811, the switching frequency suddenly drops at 806, but the control logic 410 responds by again advancing the value of ZC CTL (807) to further reduce the magnitude of the PG_GND reference signal for the comparator 530. The switching frequency responds by increasing back to approximately 21.75 KHz (809).

At 820, the load current increases which causes an increase in switching frequency as shown at 821. The counter 520 responds by decrementing the value of ZC CTL as explained above. The ZC comparator 420 responds by increasing the magnitude of its PG_GND reference signal, which results in a decrease in the switching frequency (813).

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors is described herein, other transistors (or equivalent devices) may be used instead. For example, a p-type metal-oxide-silicon field effect transistor ("MOSFET") may be used in place of an n-type MOSFET with little or no changes to the circuit. Furthermore, other types of transistors may be used (such as bipolar junction transistors (BJTs)).

Circuits described herein are reconfigurable to include additional or different components to provide functionality at least partially similar to functionality available prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means+/−10 percent of the stated value. Modifications are possible in the described examples, and other examples are possible within the scope of the claims.

Modifications are possible in the described embodiments, and other embodiments are possible, within the scope of the claims.

What is claimed is:

1. A control circuit for a voltage converter, the control circuit comprising:
    a pulse width modulation (PWM) circuit configured to produce a first control signal on a first output coupled to a control input of a first transistor and to produce a second control signal on a second output coupled to control a second transistor;
    a timeout circuit having an input coupled to the first output of the PWM circuit and configured to receive the first control signal, the timeout circuit configured to assert a timeout output signal on a timeout circuit output responsive to an expiration of a time period following the PWM circuit asserting the first control signal to turn off the first transistor;
    a counter circuit having an input coupled to the timer circuit and having a comparator circuit output, and the counter circuit is configured to, responsive to assertion of the first control signal, selectively increment an output count value on the counter circuit output responsive to the timeout output signal having a first logic state or to decrement the output count value on the counter circuit output responsive to the timeout output signal having a second logic state; and
    a comparator circuit having a control input coupled to the counter circuit output, the comparator circuit configured to adjust a magnitude of a reference signal responsive to the output count value from the counter circuit.

2. The control circuit of claim 1, in which the comparator circuit includes a comparator having a first comparator input and a second comparator input, the first comparator input configured to receive the reference signal, and the second comparator input configured to receive a signal indicative of a magnitude of current through at least one of the first or second transistors.

3. The control circuit of claim 1, in which the time period is approximately 50 microseconds.

4. The control circuit of claim 1, in which the counter circuit includes an up/down counter having a clock input, and the control circuit includes a logic gate having a first logic gate input, a second logic gate input, and a logic gate output, the first logic gate input is configured to receive the first control signal, the second logic gate input is configured to receive to receive a blanking control signal, and the logic gate output is coupled to the clock input of the counter.

5. The control circuit of claim 4, in which, when in a first logic state of the blank signal, the logic gate output is configured to prevent the up/down counter from counting, and when in a second logic state of the blanking control signal, the logic gate is configured to clock the up/down counter responsive to transitions in the first control signal.

6. The control circuit of claim 4, in which the timeout circuit is a multi-stage timer circuit, the logic gate is a first logic gate, and the control circuit includes a second logic gate, the second logic gate having an input configured to receive a clock signal, and having another input coupled to an output of a stage of the multi-stage timer circuit.

7. The control circuit of claim 1, in which the comparator circuit includes:
    a comparator having a first comparator input;
    a first current source coupled in series with a first switch between a voltage supply terminal and the first comparator input; and
    a second current source coupled in series with a second switch between a voltage supply terminal and the first comparator input.

8. The control circuit of claim 7, in which the first and second current sources are binary-weighted.

9. The control circuit of claim 7, in which the comparator circuit output is a binary signal having a first bit and a second bit, the first bit coupled to a control input of the first switch, and the second bit coupled to a control input of the second switch.

10. The control circuit of claim 1, in which the control circuit is configured to control a buck converter.

11. A control circuit for a voltage converter, the control circuit comprising:
a timeout circuit configured to receive a first control signal, the timeout circuit configured to assert a timeout output signal on a timeout circuit output responsive to an expiration of a time period following assertion of the first control signal;
a counter circuit having an input coupled to the timeout circuit output and having a counter circuit output, and the counter circuit is configured to, responsive to assertion of the first control signal, selectively increment an output count value on the counter circuit output responsive to the timeout output signal having a first logic state or to decrement the output count value on the counter circuit output responsive to the timeout output signal having a second logic state; and
a comparator circuit having a control input coupled to the counter circuit output, the comparator circuit configured to adjust a magnitude of a reference signal responsive to the output count value from the counter circuit.

12. The control circuit of claim 11, in which the comparator circuit includes a comparator having a first comparator input and a second comparator input, the first comparator input configured to receive the reference signal, and the second comparator input configured to receive a signal indicative of a magnitude of current through a transistor.

13. The control circuit of claim 11, in which the counter circuit includes an up/down counter having a clock input, and the control circuit includes a logic gate having a first logic gate input, a second logic gate input, and a logic gate output, the first logic gate input is configured to receive the first control signal, the second logic gate input is configured to receive to receive a blanking control signal, and the logic gate output is coupled to the clock input of the counter.

14. The control circuit of claim 13, in which, when in a first logic state of the blank signal, the logic gate output is configured to prevent the up/down counter from counting, and when in a second logic state of the blanking control signal, the logic gate is configured to clock the up/down counter responsive to transitions in the first control signal.

15. The control circuit of claim 13, in which the comparator circuit includes:
a comparator having a first comparator input;
a first current source coupled in series with a first switch between a voltage supply terminal and the first comparator input; and
a second current source coupled in series with a second switch between a voltage supply terminal and the first comparator input.

16. The control circuit of claim 15, in which the comparator circuit output has a first bit and a second bit, the first bit coupled to a control input of the first switch, and the second bit coupled to a control input of the second switch.

17. A control circuit for a voltage converter, the control circuit comprising:
a timeout circuit configured to receive a first control signal, the timeout circuit configured to assert a timeout output signal on a timeout circuit output responsive to an expiration of a time period following assertion of the first control signal;
a counter circuit having an input coupled to the time output circuit output and having a multi-bit counter circuit output, the counter circuit is configured to, responsive to assertion of the first control signal, selectively increment an output count value on the multi-bit counter circuit output responsive to the timeout output signal having a first logic state or to decrement the output count value on the counter circuit output responsive to the timeout output signal having a second logic state;
a comparator having a first comparator input and a second comparator input;
a first current source coupled in series with a first switch between a voltage supply terminal and the first comparator input, a first bit of the multi-bit comparator circuit output is coupled to a control input of the first switch; and
a second current source coupled in series with a second switch between a voltage supply terminal and the first comparator input, a second bit of the multi-bit comparator circuit output is coupled to a control input of the second switch.

18. The control circuit of claim 17, in which the second comparator input is configured to receive a signal indicative of a magnitude of a current through a transistor of the voltage converter.

19. The control circuit of claim 17, in which the current sources are binary-weighted.

20. The control circuit of claim 17, in which the time period is approximately 50 microseconds.

* * * * *